United States Patent
Paquelet (10) Patent No.: US 7,295,606 B2
(45) Date of Patent: Nov. 13, 2007

(54) TRANSMISSION METHOD FOR TRANSMITTING DATA SYMBOLS TO OR FROM USERS OF AN ULTRA BANDWIDTH TELECOMMUNICATION SYSTEM

(75) Inventor: Stephane Paquelet, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 853 days.

(21) Appl. No.: 10/683,405

(22) Filed: Oct. 14, 2003

(65) Prior Publication Data
US 2004/0141547 A1    Jul. 22, 2004

(30) Foreign Application Priority Data
Oct. 11, 2002    (EP) .................. 02292519

(51) Int. Cl.
*H03K 7/08*    (2006.01)
(52) U.S. Cl. ...................... 375/238; 375/253
(58) Field of Classification Search ........... 375/238, 375/239, 242, 253
See application file for complete search history.

(56) References Cited

U.S. PATENT DOCUMENTS

| | | | |
|---|---|---|---|
| 6,226,282 B1 * | 5/2001 | Chung | 370/335 |
| 2004/0057500 A1 * | 3/2004 | Balachandran et al. | 375/138 |

FOREIGN PATENT DOCUMENTS

WO    WO 01/97396 A2    12/2001

OTHER PUBLICATIONS

Ramirez-Mireles F., XP001103037, "Performance of Ultrawideband SSMA Using Time Hopping and M-Ary PPM"; IEEE Journal on Selected Areas in Communication, IEEE Inc. New York, US, vol. 19, No. 6, Jun. 2001: pp. 1186-1196.
Win M. Z. et al., XP000932191, "Ultra-Wide Bandwidth Time-Hopping Spead-Spectrum Impulse Radio for Wireless Multiple-Access Communicatiom", IEEE Transactions on Communications, IEEE Inc. New York, US, vol. 48, No. 4, Apr. 2000, pp. 679-691.
Tomaso Erseghe, et al.; "Ultra Wide Band Pulse Communications"; Thesis Study at the Universita Degli Studi Di Padova; pp. 1-144; Apr. 1999 to Dec. 2001.

* cited by examiner

*Primary Examiner*—Kevin Kim
(74) *Attorney, Agent, or Firm*—Oblon, Spivak, McClelland, Maier & Neustadt, P.C.

(57) ABSTRACT

The invention relates to a transmission method for transmitting data symbols to or from users of an ultra bandwidth telecommunication system, each user (u) of said system being associated with a specific time hopping pattern consisting of a plurality ($N_s$, $N_b$) of integers ($c_j^u$), the signal transmitted to or from a user consisting of sequences of the same plurality of frames, each integer of said pattern being associated with a corresponding frame and each frame containing a pulse time-shifted from the beginning thereof by an amount ($c_j^u T_c$) determined by said associated integer, the pulses of one sequence being further position modulated by one or a plurality ($n_b$) of data symbols to be transmitted to or from said user. According to the transmission method of the invention, the time at which a sequence of a user is transmitted is obtained from a pseudo-random sequence specific to said user. The invention equally relates to the corresponding transmitter.

15 Claims, 4 Drawing Sheets

TRANSMISSION METHOD FOR TRANSMITTING DATA SYMBOLS TO OR FROM USERS OF AN ULTRA BANDWIDTH TELECOMMUNICATION SYSTEM

CROSS REFERENCE TO RELATED APPLICATIONS

The present application relates to EPC patent application 02292519.2, filed on Oct. 11, 2002, the entire contents of which are incorporated by reference.

BACKGROUND OF INVENTION

1. Field of the Invention

The present invention relates to a transmission method and a transmitter for use in an ultra wide bandwidth (UWB) telecommunication system, including in an impulse radio system.

2. Description of the Related Art

UWB is a known spread spectrum technique which originates from the radar field and has recently gained considerable interest for use in short-range wireless communication, especially for indoor applications. One of the most promising UWB schemes, proposed by R. A. Scholtz in 1993 and also called Impulse Radio (IR), is based on the transmission of sequences of very short pulses. More specifically, as described in detail further below, Impulse Radio relies upon pulse modulation for modulating the data to be transmitted and ensures multiple access by providing different time-hopping sequences to different users. A comprehensive review of the UWB communication techniques, including impulse radio, can be found in the PhD thesis of T. Erseghe available on the website www.dei.unipd.it/~erseghe/.

Let us consider an impulse radio system in which data symbols are transmitted to or from different users $u$, $u=1, \ldots, N_u$. Each user $u$ is allocated a time-hopping pattern defined by a plurality $N_s$ of integers $c_j^u$, $j=0, \ldots, N_s-1$ where $N_s$ is the number of transmission time intervals (hereinafter referred to as frames) used for transmitting a symbol and the integers $c_j^u$ belong to , $[0, N_c-1]$, each frame being constituted of $N_c$ chips. The UWB signal transmitted to or from a given user $u$ is obtained by modulating a basic sequence specific thereto and that can be expressed as:

$$S^u(t) = \delta^u(t) p(t) \quad (1)$$

where $p(t)$ is a function giving the waveform of a single pulse, denotes the convolution operation and $\delta^u(t)$ is defined as:

$$\delta^u(t) = \sum_{j=0}^{N_s-1} \delta(t - jT_f - c_j^u T_c) \quad (2)$$

in which $\delta(t)$ denotes the Dirac function, $T_f$ and $T_c$ are respectively the duration of a frame and of a chip. $\delta^u(t)$ represents therefore a series of Dirac peaks, each peak being located in a frame (j) and being time shifted by an amount $(c_j^u T_c)$ from the beginning thereof.

The basic sequence of user u is modulated according to a pulse position modulation (PPM) with a data symbol to be transmitted to or from user u. More specifically, to each possible symbol b is assigned a binary encoded sequence $b_j$, $j=0, \ldots, N_s-1$ and the transmitted UWB signal relative to symbol b and user u can be formulated as:

$$s^u(t) = \sum_{j=0}^{N_s-1} p(t - jT_f - c_j^u T_c - b_j \delta) \quad (3)$$

where $\delta$ is a time shift which is chosen much smaller than $T_c$.

Without loss of generality, it may be assumed that the symbols b to be transmitted are simple bits and that the binary sequences assigned to b=0 and b=1 are respectively given by:

$b_j=0, \forall j$ if b=0

$b_j=1, \forall j$ if b=1

In such instance, the transmitted UWB signal corresponding to a bit b can simply be reformulated as:

$$s^u(t) = S^u(t - b\delta) = \sum_{j=0}^{N_s-1} p(t - jT_f - c_j^u T_c - b\delta) \quad (4)$$

More generally, if a sequence of bits $b_n$ is transmitted to or from a user u, the corresponding transmitted UWB signal can be expressed as:

$$s_{tr}^u(t) = \quad (5)$$

$$\sum_n S^u(t - nT_s - b_n \delta) = \sum_n \sum_{j=0}^{N_s-1} p(t - nT_s - jT_f - c_j^u T_c - b_n \delta)$$

Figure 1:
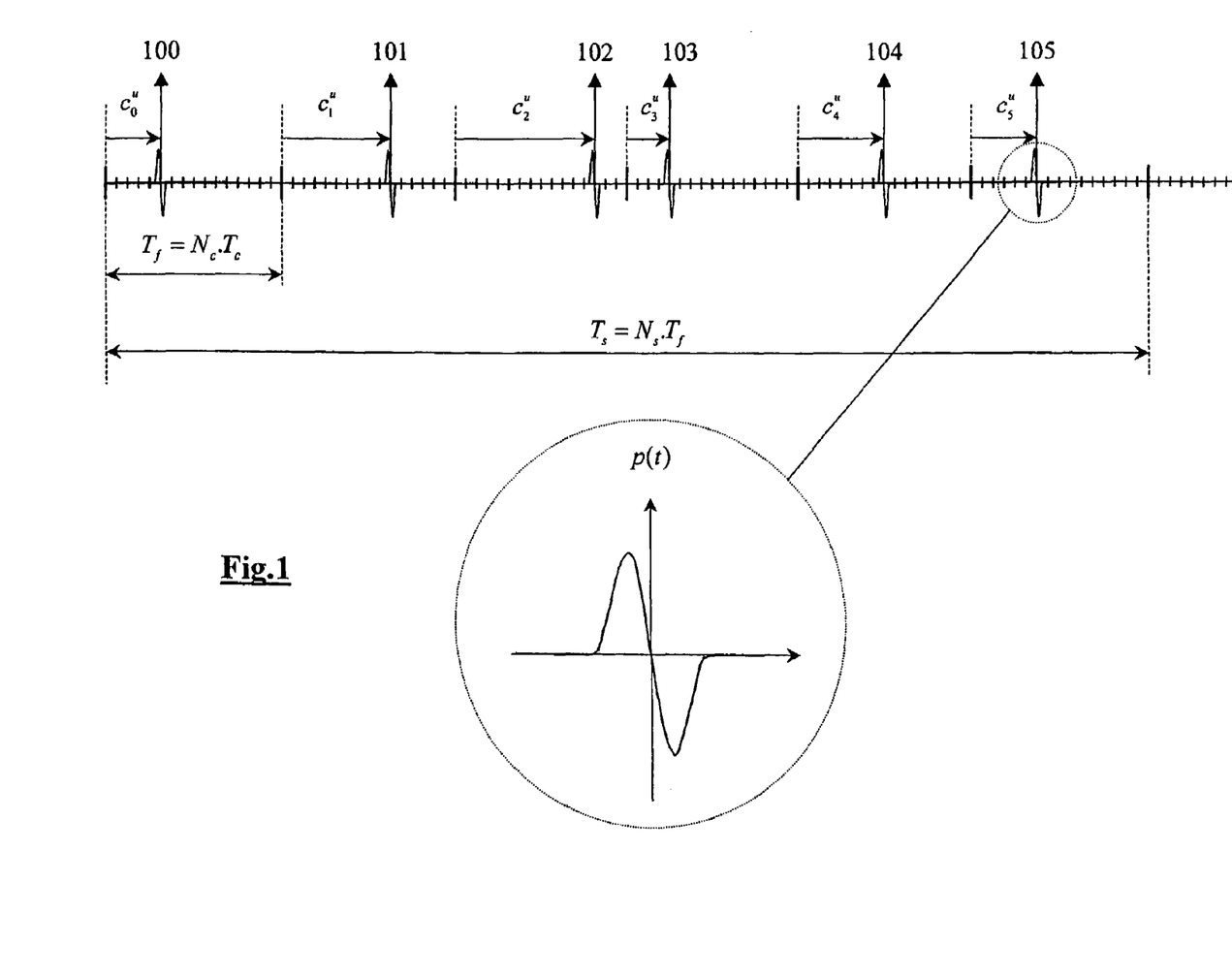
FIG. 1 depicts schematically an example of basic sequence of a user of a conventional UWB telecommunication system.

FIG. 1 shows an example of a basic sequence $S^u(t)$ relative to a user u where the pulse waveform p(t) has been zoomed in at the bottom part thereof. In the present example, the basic sequence is constituted of $N_s=6$ frames, each frame being in turn sub-divided into $N_c=16$ chips. The beginning of a frame is represented by a longer vertical stroke than the one indicating the beginning of a chip and the arrows referenced 100 to 105 represent the Dirac peaks of the above defined function $\delta^u(t)$, each peak being shifted by an amount given by the corresponding values $c_j^u$ of the time hopping pattern of user u. The basic sequence $S^u(t)$ carries a pulse of waveform p(t) at the respective locations of the Dirac peaks. For example, the pulse may be a so-called Rayleigh monopulse the waveform of which is given by:

$$p(t) = \frac{t}{\sigma^2} \cdot \exp\left(\frac{-t^2}{2\sigma^2}\right) \quad (6)$$

where $\sigma$ is a value representative of the pulse width. The shape of the waveform has been schematically represented at the bottom of the FIG. 1.

Typically, the pulse width is about 0.5 ns, the frame duration $T_f$ is a time of the order of 100 ns and $T_s$ is a time of the order of 1 μs.

When a bit to be sent has a first value, e.g. "0", the sequence of the user is transmitted as such. Conversely, when said bit to be sent takes the opposite value, e.g. "1", the positions of the pulses are shifted by a very small amount δ, typically in the order of 50 ps, relatively to the time origin of the basic sequence.

Let us first consider a transmitter sending an UWB signal over a transmission channel to a receiver (where the transmitter can be located either at a base station or at a user terminal). We assume first that a single user is active (either by transmitting or receiving). The received UWB signal can be expressed as:

$$s_{rec}(t) = \sum_k \alpha_k(t) s_{tr}^u(t - \theta^u - \tau_k(t)) + w(t) \quad (7)$$

where k indexes the different propagation paths of the transmission channel, $\alpha_k(t)$ and $\tau_k(t)$ are respectively the attenuation coefficients and propagation delays relative to the different propagation paths, $\theta^u \in [0, T_s[$ denotes a time shift between the beginning of the transmission of the UWB signal of user u and a synchronisation time origin, w(t) is the thermal noise of the receiver, assumed to be additive white gaussian (AWGN) with a bilateral spectral power density $N_0/2$.

In practice, for typical indoor applications and slow moving users (that is for moving speeds lower than 10 ms$^{-1}$), the functions $\alpha_k(t)$ and $\tau_k(t)$ can be regarded as constant over a time range of the order of 100 μs (corresponding to the transmission time of about 100 symbols) and therefore the expression of received signal can be simplified as:

$$s_{rec}(t) = \sum_k \alpha_k s_{tr}^u(t - \theta^u - \tau_k) + w(t) \quad (8)$$

where $\alpha_k$ and $\tau_k$ are constant values.

Considering now the case of a multi-user system comprising a plurality $N_u$ of transmitters, the received signal can be expressed as:

$$s_{rec}(t) = \sum_{q=1}^{N_u} \sum_{k_q} \alpha_{k_q}^q s_{tr}^q(t - \theta^q - \tau_{k_q}^q) + w(t) \quad (9)$$

where $k_q$ now indexes the propagation paths of the transmission channels between the different transmitters and the receiver in question and $\alpha_{k_q}^q$, $\tau_{k_q}^q$ are the respectively the attenuation coefficient and the propagation delay relative to the $k^{th}$ propagation path of the $q^{th}$ transmission channel. This expression reflects the typical situation where a plurality of users transmit data symbols over their respective uplink transmission channels to a base station.

Similarly, for a downlink transmission in a multi-user system, since a single transmission channel has to be considered per user, the signal received by user u can be expressed as:

$$s_{rec}(t) = \sum_{q=1}^{N_u} \sum_k \alpha_k^u s_{tr}^q(t - \theta^q - \tau_k^u) + w(t) \quad (10)$$

where $\alpha_k^u$ and $\tau_k^u$ are respectively the attenuation coefficient and the propagation delay of the $k^{th}$ propagation path of the downlink transmission channel relative to user u.

Let us consider the $n^{th}$ bit transmitted to or from user u and denote:

$$s_0^u(t) = \sum_k \alpha_k^u s_{tr}^u(t - \theta^u - \tau_k^u) \text{ when } b_n = 0 \text{ in (5)} \quad (11)$$

and $$s_1^u(t) = \sum_k \alpha_k^u s_{tr}^u(t - \theta^u - \tau_k^u) \text{ when } b_n = 1 \text{ in (5)} \quad (12)$$

Defining $v^u(t) = s_1^u(t) - s_0^u(t)$, it can be shown that the optimal decision criterion at the receiving side is based on the decision variable:

$$\tilde{b}_n = \int_{t_n^{min}}^{t_n^{max}} s_{rec}(t) v^u(t) dt \quad (13)$$

where $$t_n^{min} = nT_s + \theta^u + \min_k(\tau_k^u) \text{ and } t_n^{max} = nT_s + \theta^u + \max_k(\tau_k^u) + \delta$$

define the bounds of reception time window for the $n^{th}$ bit of user u.

It should be noted that the decision variable $\tilde{b}_n$ can be regarded as the output of a filter matched to the impulse response of the transmission channel of user u. The bit estimate $\hat{b}_n$ is obtained as follows:

$$\hat{b}_n = 0 \text{ if } \tilde{b}_n \leq 0 \text{ and } \hat{b}_n = 1 \text{ if } \tilde{b}_n \geq 0 \quad (14)$$

One of the critical issues addressed in the prior art is the choice of a set of basic sequences exhibiting good auto-correlation and cross-correlation properties. More specifically, denoting respectively $$\pi^u(t) = S^u(t) \otimes \sum_n \delta(t - nT_s) \quad (15)$$

the function obtained by periodically repeating the basic sequence of user u and $C_{u,u'}(\tau)$ the correlation function between $\pi^u(t)$ and $\pi^{u'}(t)$, i.e.

$$C_{u,u'}(\tau) = \int_{T_s} \pi^u(t) \pi^{u'}(t + \tau) dt \quad (16)$$

the choice of a set a of sequences is based on the quality criteria:

$$S_{\max} = \max_{u \in \sigma, \tau \neq 0} (C_{u,u}(\tau)) \text{ and } C_{\max} = \max_{u,u' \in \sigma, \tau \in [0,T_s]} (C_{u,u'}(t)) \quad (17)$$

The first quality criterion is a low value of $S_{max}$, which means that the respective auto-correlation functions of the basic sequences of the different users exhibit low level side-lobes, improving thereby synchronisation at the receiving side. The second quality criterion is a low value of $C_{max}$, which favours the reduction of multi-access interference. It will be appreciated that $C_{u,u'}(\tau)$ is representative of the overlap between the two delayed basic sequences and essentially depends upon the number of coincidences (or hits) between delayed versions of the hopping patterns of users u and u'.

Figure 2A:
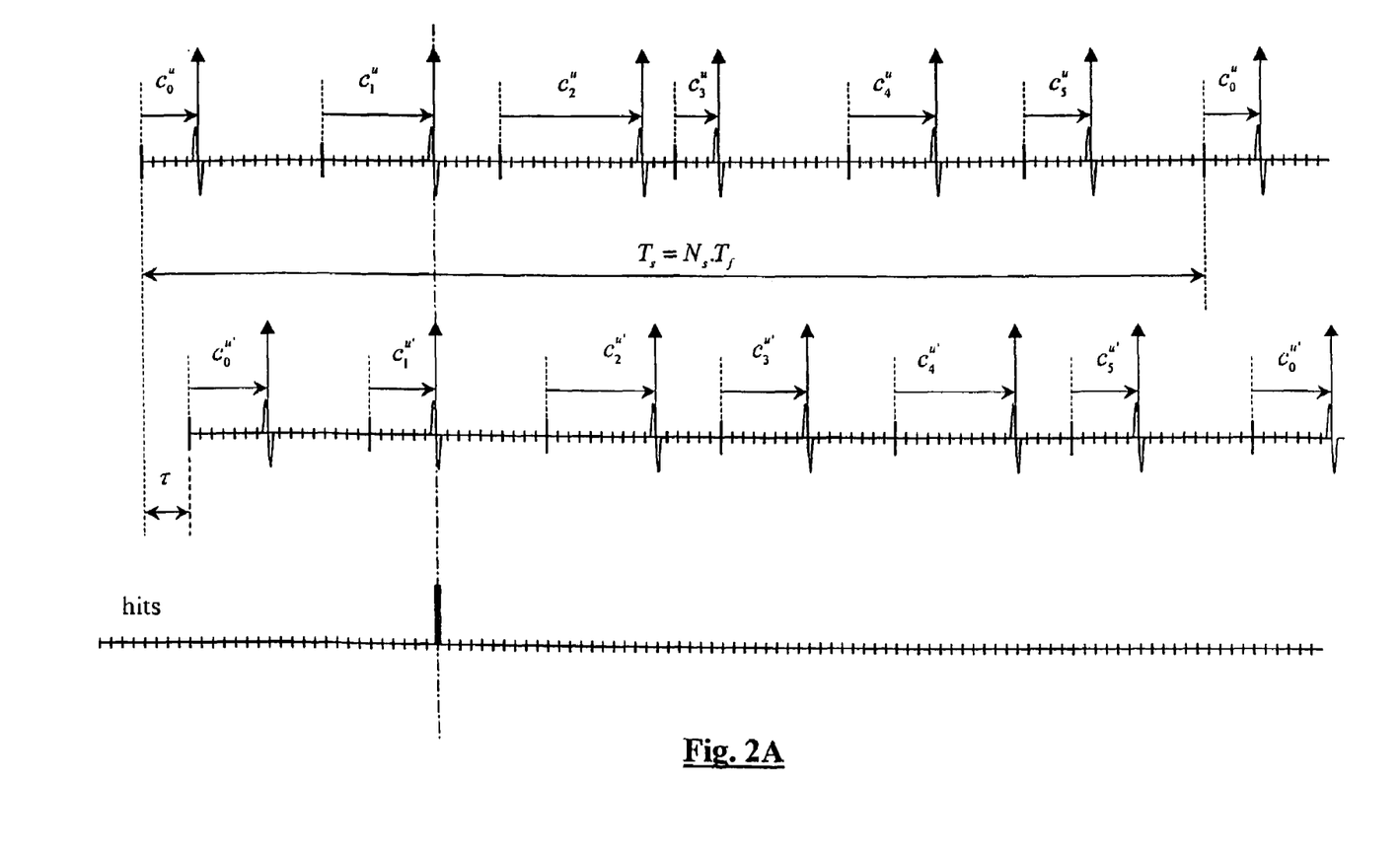
FIGS. 2A and 2B depict schematically two examples of collision between basic sequences of two different users of a conventional UWB telecommunication system.
Figure 2B:
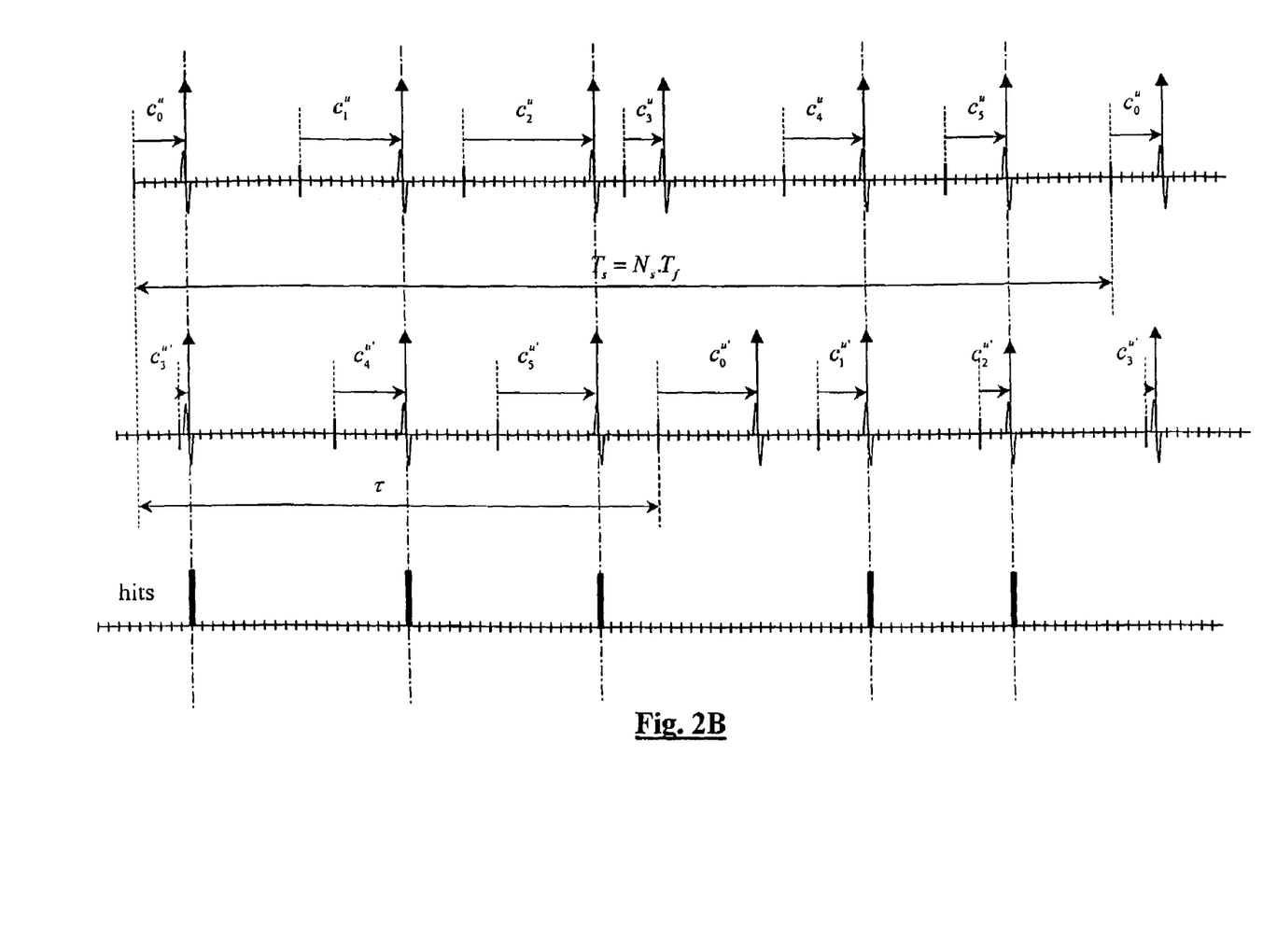

FIGS. 2A and 2B illustrate the situation where a basic sequence of a given user u interferes with a basic sequence of another user u' at the receiving side. This could be the case if, for example, the two sequences have travelled along different propagation paths, although their respective transmitters are synchronised. This could also be the case, if these sequences have travelled along the same propagation path but their respective transmitters are not synchronised (or, alternatively, neither their propagation paths are the same nor their respective transmitters are synchronised).

As a matter of example, while FIG. 2A shows a case where the collision can be resolved by the receiver, FIG. 2B shows a severe collision of sequences with a large score of hits leading to a high probability of false detection. Such type of collision will be hereinafter referred to as catastrophic.

In practice, the risk of collision between received sequences is not negligible and can dramatically increase the bit error rate of the communication affected by the collision. This is all the more significant since the characteristics of the transmission channels are likely to be constant in an indoor environment (e.g. the transmitter(s) and receiver(s) are fixed) and therefore a catastrophic collision may repeat at quite a high rate.

SUMMARY OF INVENTION

A first object of the invention is therefore to propose a transmission method (and corresponding transmitter) for reducing the bit error rate in an UWB telecommunication system.

A subsidiary object of the invention is to provide a set of sequences satisfying a quality criterion ensuring a low bit error rate.

Advantageous embodiments of the invention are defined in the further dependent claims.

DESCRIPTION OF THE DRAWINGS

The advantages and characteristics of the invention will emerge from a reading of the following description given in relation to the accompanying figures, amongst which.

DETAILED DESCRIPTION

We refer back again to the context of an UWB telecommunication system in which multi-access is provided by different time hopping patterns $\delta^u$ (and, hence, different basic sequences $S^u$).

In the present invention the time shifts $\theta^u$ of the different users are randomized so as to avoid recurrent catastrophic collision schemes. More specifically, the present invention generates time shifts $\theta^u$ from a pseudo-random sequence specific to user u, a new time shift being typically generated at a multiple of the symbol period $T_s$. At the receiving side, the knowledge of the pseudo-random sequence allows to compensate for the time shifts $\theta^u$ and therefore to synchronise with the basic sequences of user u while the basic sequences of any other user will appear to start at random time positions relatively thereto.

First, the concept of basic sequence set out above will be extended. The basic sequence of a user u will be assumed to adopt the more general form:

$$S^u(t) = \sum_{j=0}^{N_b-1} p(t - jT_f - c_j^u T_c) \text{ where } N_b = n_b \cdot N_s \quad (18)$$

where the integers $c_j^u$, $j=0, \ldots, N_b-1$ define the time hopping pattern relative to the user u, i.e.

$$\delta^u(t) = \sum_{j=0}^{N_b-1} p(t - jT_f - c_j^u T_c).$$

The basic sequence defined in (18) can be pulse position modulated (PPM) by a block B of $n_b$ consecutive data symbols: $b_0, b_1, \ldots, b_{n_b-1}$, e.g. bits to produce an UWB signal:

$$s_B^u(t) = \sum_{n=0}^{n_b-1} \sum_{j=0}^{N_s-1} p(t - nT_s - jT_f - c_{nN_s+j}^u T_c - b_n \delta). \quad (19)$$

that is, for a series of concatenated blocks $B_m$:

$$s_{tr}^u(t) = \sum_m s_{B_m}^u(t - mT_b) \quad (20)$$

where $T_b = n_b T_s$ is the block time length and the block $B_m$ is constituted of symbols $b_{m,0}, b_{m,1}, \ldots, b_{m,n_b-1}$.

In contrast to expression (5), the time hopping pattern $c_j^u, j=0, \ldots, N_b-1$ appearing in the more general expression (19) encodes one or a plurality ($n_b$) of data symbols.

According to the invention, a pseudo-random time shift (or delay) $\theta_m^u$ is introduced prior to the transmission of each block $B_m$, so that the UWB signal transmitted to or from user u can finally be written:

$$s_{tr}^u(t) = \sum_m s_{B_m}^u(t - \theta_m^u - mT_b) \quad (21)$$

The provision of a pseudo-random delay $\theta_m^u$ for each user u considerably reduces the risk of recurring catastrophic collisions between received sequences and therefore improves the bit error rate.

Furthermore, the pseudo-random sequence giving the delays $\theta_m^u$ being known from the receiver, these delays can be compensated for in the expressions $s_0^u(t)$ and $s_0^u(t)$, that is for a given symbol $b_{m,n}$ of block $B_m$:

$$s_0^u(t) = \sum_k a_k^u s_{B_m}^u(t - \theta_m^u - \tau_k^u) \text{ when } b_{m,n} = 0 \text{ in (20)} \quad (22)$$

and $$s_1^u(t) = \sum_k a_k^u s_{B_m}^u(t - \theta_m^u - \tau_k^u) \text{ when } b_{m,n} = 1 \text{ in (20)} \quad (23)$$

As stated in the background, the correlation of the received signal with the function $v^u(t)=s_1^u(t)-s_0^u(t)$ gives the decision variable $\tilde{b}_{m,n}$.

Figure 3:
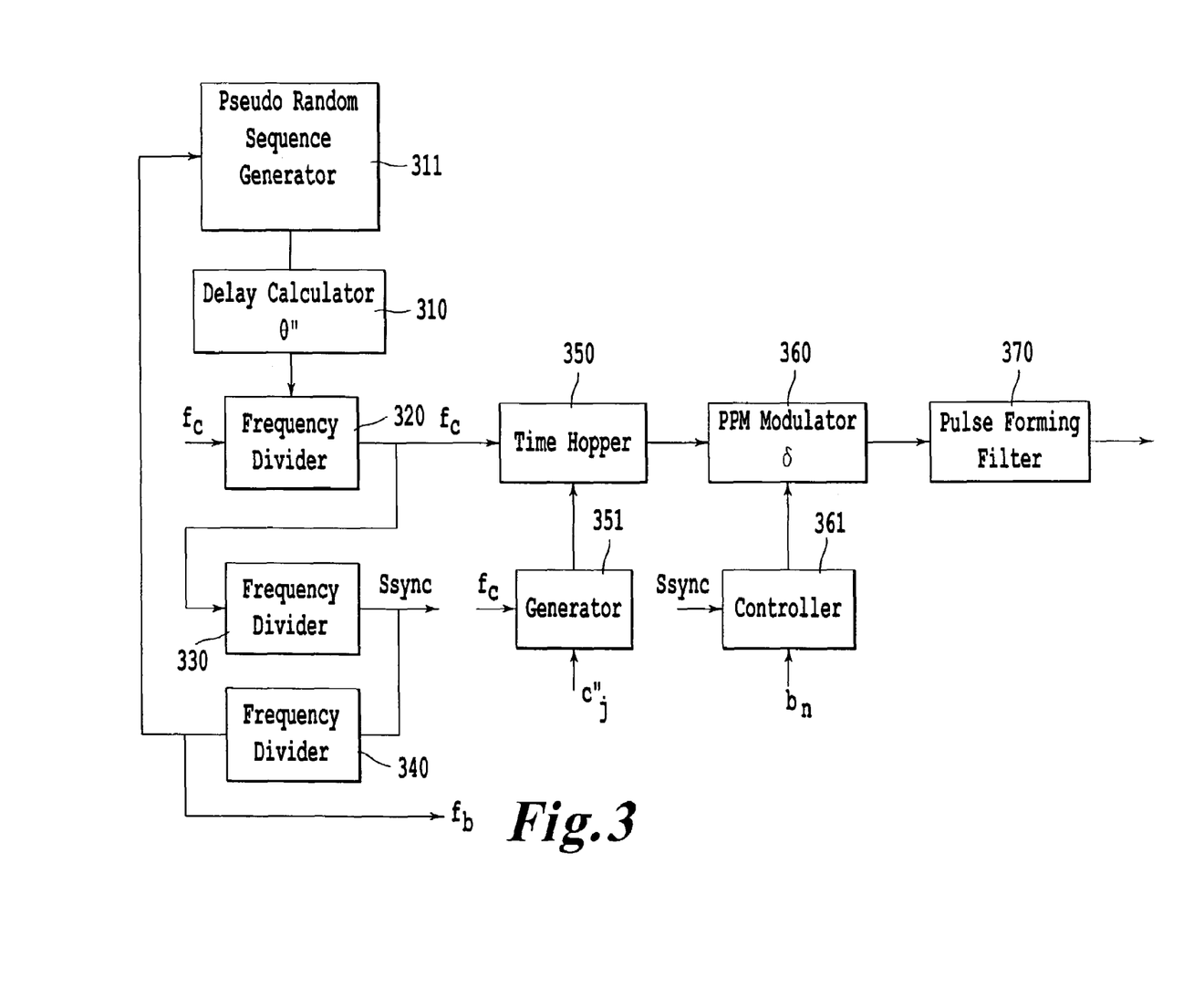
FIG. 3 depicts schematically an embodiment of a transmitter according to the invention.

The structure of a transmitter according to an embodiment of the invention is schematically illustrated in FIG. 3.

The transmitter comprises first frequency dividing means (e.g. a counter) 320 inputting a clock signal at the chip frequency $$f_c = \frac{1}{T_c}$$

hereinafter referred to as chip frequency signal) and outputting a pulse signal at the frame frequency $$f_f = \frac{1}{T_f},$$

second frequency dividing means 330 inputting said frame frequency signal and outputting a clock signal at the symbol frequency $$f_s = \frac{1}{T_s},$$

and third frequency dividing means 340 inputting said symbol frequency signal and outputting a signal at the block frequency $$f_b = \frac{1}{T_b}.$$

A pseudo-random sequence generator 311 receives said block frequency signal and transmits for each block $B_m$ a pseudo-random number to a delay calculating means 310. The delay $\theta_m^u$ thus obtained is used for initialising the first frequency dividing means 320 (e.g. for triggering the counter if a counter is used). In a variant of the invention, the delay $\theta_m^u$ is not output at the block frequency but only at a sub-multiple frequency thereof.

The pseudo-random sequence generated by generator 311 is specific to the user u in question and could be, for example, a maximum length sequence, as known in the art. Furthermore, the variation range of the delay $\theta_m^u$ can be chosen much narrower than the block period $T_b$ itself(or much narrower than the symbol period $T_s$ when $n_b=1$). By so doing, the symbol jitter is kept at low level and the useful symbol transmission rate is not reduced.

The frame frequency signal output from first dividing means 320 is modulated by time-hopping means 350 controlled by a time hopping pattern generator 351. The latter generator is initialised by the block frequency signal and clocked by the frame frequency signal. Once initialised, the generator 351 starts outputting the time hopping pattern $c_j^u$, $j=0, \ldots, N_b-1$ at the frame frequency and, the time-hopping means 350 outputs, for each frame j, a pulse time-shifted by an amount $c_j^u \cdot T_c$ from the beginning thereof.

The time-hopped signal generated by time-hopping means 350 is further input to the PPM modulating means 360 which delays the input signal by a time amount δ when ordered to do so by a control signal output from the delay controlling means 361.

The controlling means 361 is initialised at each symbol block $B_m$ by the block frequency signal. A control signal is then generated at the symbol frequency e.g. when a data symbol $b_{m,n}$ takes a "0" value, the time-hopped signal is not delayed by the PPM modulating means and when it takes a "1" value, the PPM modulating signal delays the time-hopped signal by a predetermined time amount δ.

The signal output from PPM modulating means 360 is constituted of very short pulses which are shaped in the pulse forming filter 370 of impulse response p(t).

It will be appreciated by one skilled in the art that the structure of the transmitter can be modified without departing from the scope of the invention. For example, the time hopped signal could be first pulse formed in 370 before being supplied to the delaying means 360. Similarly the time delay $\theta_m^u$ could be applied at different stages of the transmitter e.g. at the input or the output of the pulse forming filter.

It should also be noted that all or parts of this transmitter can be implemented by means of a single processor either dedicated for performing all the functions depicted above or in the form of a plurality of processors either dedicated or programmed for each performing one or some of said functions.

The transmitter described above can be located either in the terminal of the user (for an uplink transmission) or in a base station (for a downlink transmission). In the latter case, the structure of the transmitter can advantageously be simplified by having first, second and third frequency dividing means in common for the different users and by time-shifting with different delays $\theta_m^u$, the common frame, symbol and block frequency signals thus generated.

In both cases, at the receiving side, the sequences of the other users $u' \neq u$ will appear at random receiving times uniformly distributed over the interval product $[0,T_b[\times[0,T_b[\times \ldots \times[0,T_b[$ ($N_u-1$ factors). The risk of recurring catastrophic collisions affecting the UWB transmission systems proposed in the prior art, is thereby removed.

A further advantage over the prior art is that the criterion for selecting good hopping patterns ($c_j^u, j=0, \ldots, N_b-1$) with respect to multi-access interference, is significantly relaxed. It is recalled here that the quality criterion of the prior art was based on a low maximum value $C_{max}$ of the maxima of the pattern intercorrelation functions for any pair of patterns, as defined in (17).

In contrast, when using the transmission method according to the invention, it can be shown that the bit error rate for a given user u is expressed as:

$$P_e = \text{erfc}\left\{(1-\cos\alpha_\delta) \cdot \sqrt{\frac{E^u}{\sum_{\substack{u'=1 \\ u' \neq u}}^{N_u'} E^{u'} \Gamma^{uu'} + \beta_\delta^2 \cdot \frac{N_0}{2}}}\right\} \quad (24)$$

where erfc is the tail of the gaussian function, $E^u$ is the energy of the desired signal associated with user u (as obtained after path combining), $E^{u'}$ is the energy of an interfering signal due to user u', $$\frac{N_0}{2}$$

is the spectral density of the thermal noise at the receiver and:

$$\cos\alpha_\delta = \frac{\langle p(.)|p(.-\delta)\rangle}{\|p(.)\|^2} \quad (25)$$

$$\beta_\delta = \frac{\|p(.) - p(.-\delta)\|}{\|p(.)\|} \quad (26)$$

where the notations $\langle f|g\rangle$ and $\|f\|$ respectively stand for the scalar product of two functions $f$, $g$ and the norm of a function $f$ in $L^2(R)$ (i.e.

$$\langle f|g\rangle = \int_{-\infty}^{+\infty} f(t)g(t)\,dt);$$

and $$\Gamma^{uu'} = E\left(\left(\frac{\langle s_{tr}^{u'}(.-\theta^{uu'})|s_B^u(.) - s_{B'}^u(.)\rangle}{\|S\|^2}\right)^2\right) \quad (27)$$

represents an energy coupling coefficient, E denotes the mean value taken over the possible time shifts $\theta^{uu'}$ between the users u and u', the possible pairs of symbol blocks B and B', B and B' differing on one symbol only, and $\|S\|^2 = N_b \|p\|^2$ is the energy of the transmitted signal (assumed identical for all the users).

If we assume that the delay $\delta$ is substantially smaller than the width of the pulse $p(t)$, we can rightfully approximate $s_{tr}^{u'}(t)$ as the repetition of the same basic sequence $S^{u'}(t)$ Denoting then $\check{s}^{u'}(t)$ the function obtained by repeating $S^{u'}(t)$:

$$\Gamma^{uu'} = E\left(\left(\frac{\langle \check{s}^{u'}(.-\theta^{uu'})|s_B^u(.) - s_{B'}^u(.)\rangle}{\|S\|^2}\right)^2\right) \quad (28)$$

When the symbol block reduces to only one symbol, the expression $\Gamma^{uu'}$ can be reformulated as:

$$\Gamma^{uu'} = E\left(\left(\frac{\langle \check{s}^{u'}(.-\theta^{uu'})|S^u(.) - S^u(.-b\delta)\rangle}{\|S\|^2}\right)^2\right) \quad (29)$$

where the mean value is taken over the possible time shifts $\theta^{uu'}$ between the users u and u' and the two possible values of b (two values have to be considered per time shift).

For symmetry reasons and in order to ensure a uniform MAI among the users, it seems reasonable to require that the coupling coefficients $\Gamma^{uu'}$ are all identical. The expression (24) of the bit error rate can therefore be simplified:

$$P_e = \text{erfc}\left\{(1-\cos\alpha_\delta) \cdot \sqrt{\frac{E^u}{(N_u-1)\overline{E^{u'}}\Gamma + \beta_\delta^2 \cdot \frac{N_0}{2}}}\right\} \quad (30)$$

where $\Gamma$ is the common coupling coefficient and $\overline{E^{u'}}$ is the mean energy of the interfering signals. The expression (30) clearly shows that the bit error rate is an increasing function of $\Gamma$.

The expressions (28) and (29) can respectively be rewritten:

$$\Gamma = \int_0^{T_b} \left(\frac{\langle s^{u'}(.-\theta \bmod T_b)|s_B^u(.) - s_{B'}^u(.)\rangle}{\|S\|^2}\right)^2 d\theta \quad (31)$$

and $$\Gamma = \int_0^{T_s} \left(\frac{\langle S^{u'}(.-\theta \bmod T_s)|S^u(.) - S^u(.-\delta)\rangle}{\|S\|^2}\right)^2 d\theta \quad (32)$$

where mod denotes the modulo operation.

The coupling coefficient $\Gamma$ is proposed here as a quality criterion for selecting sequences. A low value thereof of $\Gamma$ indicates a "good" set of sequences with respect to multi-access interference. The value of the coupling coefficient essentially depends on the hopping patterns of the different users, the shape of the pulse waveform $p(t)$ and the time amount $\delta$. In practice, it is convenient to split the quality criterion in sub-criteria and, starting with the selection of the hopping patterns. An ad hoc sub-criterion leading to low values of $\Gamma$ proved to be the average value ($\gamma$) of the squared periodic cross-correlation function of the hopping patterns. More precisely, denoting $\delta_p^{u'}$ the periodic function obtained by repeating the hopping pattern of user u', that is, denoting:

$$\delta_p^{u'}(t) = \delta^{u'}(t) \otimes \sum_n \delta(t - nT_b) \quad (33)$$

$$(\text{or } \delta_p^{u'}(t) = \delta^{u'}(t) \otimes \sum_n \delta(t - nT_s))$$

if one data symbol modulates one sequence)

$$\gamma = \frac{1}{T_b} \int_{T_b} (c_{u',u}(\tau))^2 d\tau \quad (34)$$

where $$c_{u',u}(\tau) = \left( \int_0^{T_b} \delta_p^{u'}((t+\tau) \bmod T_b) \delta^u(t) dt \right) \quad (35)$$

(and similarly, $$\gamma = \frac{1}{T_s} \int_{T_s} \left( \int_0^{T_s} \delta_p^{u'}((t+\tau) \bmod T_b) \delta^u(t) dt \right)^2 d\tau$$

in the above mentioned case).

It is important to note that the relevant criterion is not the maximum value of $c_{u,u'}(\tau)$ anymore, as in the prior art, but the average value of $c_{u,u'}^2(\tau)$ over the sequence length. This is due to the fact that, by using the transmission method according to the invention, the arrival times of the sequences of the users other than the one of interest (u) appear randomly scattered over the time range of a sequence of that user. The constraint upon the selection of hopping patterns or the corresponding sequences is therefore significantly relaxed.

The minimum non zero value of the periodic cross-correlation function $c_{u,u'}(\tau)$, in other words the minimum non zero number of coincidences (or hits) between two sequences of two distinct users for a given time shift $\tau$, being equal to one and this value being taken $N_b^2$ times by $C_{u',u}(\tau)$ over [0, $T_b$[ (since any pulse of a time-shifted sequence of user u' may coincide with any pulse of the sequence of user u), the minimum achievable value of $\gamma$ is:

$$\gamma_{\min} = \frac{N_b^2}{T_b} = \frac{N_b}{N_c \cdot T_c} \quad (36)$$

or for a normalised chip length:

$$\gamma_{\min} = \frac{N_b}{N_c} \quad (37)$$

Most hopping patterns do not achieve $\gamma = \gamma_{min}$. For example, if the sequence of a user u' coincides with a time delayed version of the sequence of user u, there is one catastrophic collision for a given time shift $\tau$ (contributing for $N_b^2$ in (34)) and at the best other $N_b^2 - N_b$ single hits, that is:

$$\gamma \geq \frac{2N_b^2 - N_b}{T_b} \quad (38)$$

In contrast, it has been found that some hopping patterns do reach the minimum value $\gamma_{min}$, like:

$$c_j^u = u.j \bmod p \quad (39)$$

or come close to it, for example $$c_j^u = u^j \bmod p \quad (40)$$

where in both cases p is a prime number.

More generally, the following families of hopping patterns have equivalent properties to those expressed in (39) and (40) respectively and so since they amount to merely shuffling the sequences and/or rotating the frames within a sequence:

$$c_j^u = (u+\alpha).(j+\beta) \bmod p \quad (41)$$

and $$c_j^u = (u+\alpha)^{(j+\beta)} \bmod p \quad (42)$$

where $\alpha$, $\beta$ are predetermined integers and p is a prime number.

Although, the transmission method and corresponding transmitter according to the invention have essentially been described for transmitting bits or block of bits, it should be understood that the invention more generally applies to the transmission of M-ary symbols or blocks thereof, in which case the pulse position modulation would use a plurality of delays $\delta_1, \delta_2, \ldots, \delta_{M-1}$ for encoding said symbols.

The invention claimed is:

1. A method for transmitting data symbols to or from users of an ultra bandwidth telecommunication system, each user (u) of said system being associated with a specific time hopping pattern consisting of a plurality ($N_s$, $N_b$) of integers ($c_j^c$), a signal including said data symbols transmitted to or from a user consisting of sequences of frames, each integer of said specific time hopping pattern being associated with a corresponding frame and each frame containing a pulse time-shifted from the beginning thereof by an amount ($c_j^u T_c$) determined by said associated integer, comprising:

pulse position modulating one of said sequences by one or a plurality ($n_b$) of said data symbols to be transmitted to or from said user;

based on a pseudo-random sequence specific to said user, determining a time at which said sequence is to be transmitted;

time-shifting the time at which the sequence is transmitted from an end of a preceding sequence by a time shift ($\theta_m^u$), said time shift being determined as a function of a number of a pseudo-random sequence specific to said user; and transmitting said sequence to or from said user at the determined time.

2. The method according to claim 1, further comprising: time-shifting the time at which the sequence is transmitted from a reference synchronisation signal common to all users by a time shift ($\theta_m^u$), said time shift being determined as a function of a number of a pseudo-random sequence specific to said user.

3. The method according to claim 1, further comprising: time-shifting the time at which the sequence is transmitted by a time shift from a synchronisation signal generated locally by said user, said time shift ($\theta_m^u$) being determined as a function of a number of a pseudo-random sequence specific to said user.

4. The method according to claim 2, further comprising: obtaining a new time shift from said pseudo-random sequence for every sequence of a user.

5. The method according to claim 1, further comprising: obtaining a new time shift from said pseudo-random sequence for every sequence of a user.

6. The method according to any of claim 3, further comprising:
obtaining a new time shift from said pseudo-random sequence for every sequence of a user.

7. The method according to claim 2, further comprising: obtaining a new time shift from said pseudo-random sequence for each sequence of a user out of a predetermined plurality thereof.

8. The method according to claim 1, further comprising: obtaining a new time shift from said pseudo-random sequence for each sequence of a user out of a predetermined plurality thereof.

9. The method according to claim 3, further comprising: obtaining a new time shift from said pseudo-random sequence for each sequence of a user out of a predetermined plurality thereof.

10. The method according to any one of claims 1-2 and 3-9, further comprising:
chosing time hopping patterns of the different users such that an average value ($\gamma$) of a squared cross-correlation function of any pair of sequences of distinct users (u,u') is equal or substantially equal to a predetermined minimum value ($\gamma_{min}$).

11. The method according to any one of claims 1-2 and 3-9, further comprising:
determining a plurality of integers of the time hopping pattern associated with a user by the following expression:

$c_j^u = (u+\alpha).(j+\beta) \mod p$ where u is an integer indexing said user, j is an integer indexing a frame of a sequence of said user, $\alpha,\beta$ are predetermined integers, and p is a prime number.

12. The method according to any one of claims 1-2 and 3-9, further comprising:
determining a plurality of integers of the time hopping pattern associated to a user by the following expression:

$c_j^u = (u+\alpha)^{(j+\beta)} \mod p$ where u is an integer indexing said user, j is an integer indexing a frame of a sequence of said user, $\alpha,\beta$ are predetermined integers, and p is a prime number.

13. A transmitter for transmitting data symbols to or from at least one user of an ultra bandwidth telecommunication system, each user (u) of said system being associated with a specific time hopping pattern consisting of a plurality ($N_s$, $N_b$) of integers ($c_j^u$), said transmitter comprising:

means for generating sequences of frames, each integer of said specific time hopping pattern being associated with a corresponding frame of said sequence;

means for shifting a pulse of said corresponding frame of said sequence by an amount of time ($c_j^u T_c$) determined by said associated integer; and means for modulating positions of pulses of a sequence by one or a plurality of data symbols to be transmitted to or from said user, comprising means for generating a pseudo-random sequence specific to said user, means for determining, from a number of said pseudo-random sequence, a time at which a sequence is to be transmitted to or from said user, means for time-shifting the time at which the sequence is transmitted from an end of a preceding sequence by a time shift ($\theta_m^u$), said time shift being determined as a function of a number of a pseudo-random sequence specific to said user; and means for transmitting said sequence to or from said user at the determined time.

14. A transmitter for transmitting data symbols to or from at least one user of an ultra bandwidth telecommunication system, each user (u) of said system being associated with a specific time hopping pattern consisting of a plurality ($N_s$, $N_b$) of integers ($c_j^u$), said transmitter comprising:

a frame generator configured to generate a sequences of frames, each integer of said specific time hopping pattern being associated with a corresponding frame of said sequence;

a pulse shifter configured to shift a pulse of said corresponding frame of said sequence by an amount of time ($c_j^u T_c$) determined by said associated integer; and a pulse position modulator configured to modulate positions of pulses of a sequence by one or a plurality of data symbols to be transmitted to or from said user, comprising a pseudo-random sequence generator configured to for generate a pseudo-random sequence specific to said user, a transmission timer configured to determine, from a number of said pseudo-random sequence, a time at which a sequence is to be transmitted to or from said user, a time-shifter configured to shift the time at which the sequence is transmitted from an end of a preceding sequence by a time shift ($\theta_m^u$), said time shift being determined as a function of a number of a pseudo-random sequence specific to said user; and a transmitter device configured to transmit said sequence to or from said user at the determined time.

15. In a method for transmitting data symbols to or from users of an ultra bandwidth telecommunication system, each user (u) of said system being associated with a specific time hopping pattern consisting of a plurality ($N_s$, $N_b$) of integers ($c_j^u$), a signal including said data symbols transmitted to or from a user consisting of sequences of frames, each integer of said specific time hopping pattern being associated with a corresponding frame and each frame containing a pulse time-shifted from the beginning thereof by an amount ($c_j^u T_c$) determined by said associated integer, the pulses of one of said sequences being further position modulated by one or a plurality ($n_b$) of said data symbols to be transmitted to or from said user, the improvement comprising:

based on a pseudo-random sequence specific to said user, determining a time at which one of said sequences is to be transmitted to or from said user, and     time-shifting the time at which the sequence is transmitted from an end of a preceding sequence by a time shift ($\theta_m^u$), said time shift being determined as a function of a number of a pseudo-random sequence specific to said user.

* * * * *